A. G. & B. L. GIFFORD.
AUTOMATIC RELEASING DEVICE FOR PRESSURE PUMPS.
APPLICATION FILED MAR. 30, 1911.
1,128,596.
Patented Feb. 16, 1915.
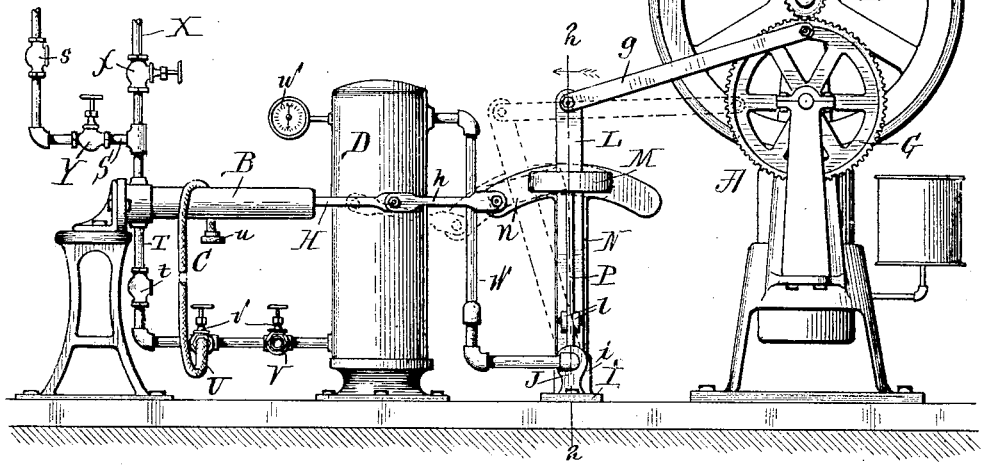
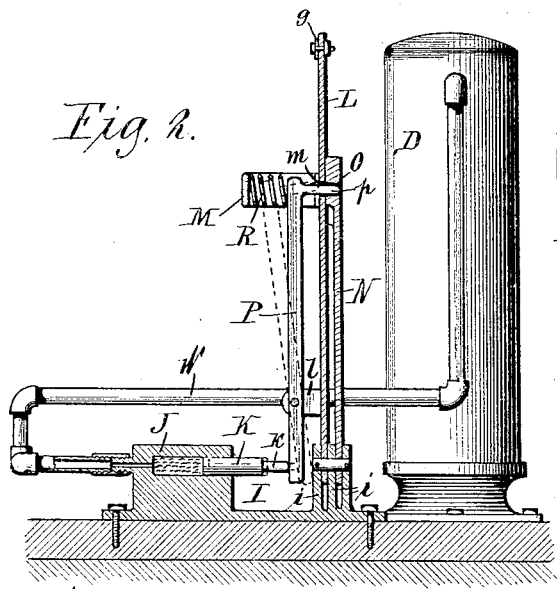
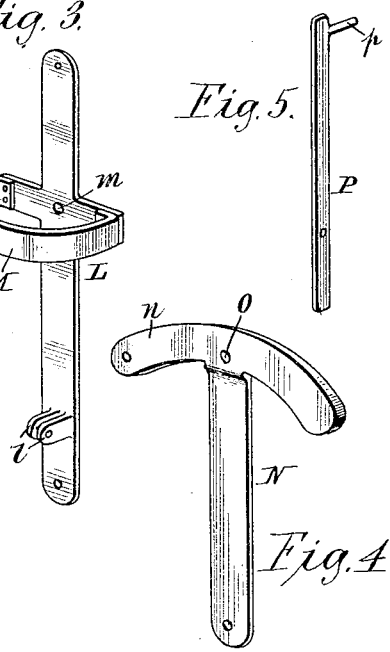
Witnesses:
Jacob Oberst, Jr.
Ella C. Rueckhahn
Arthur G. Gifford,
Bert L. Gifford,
Inventors.
By Emil Neuhart
Attorney.

UNITED STATES PATENT OFFICE.

ARTHUR G. GIFFORD AND BERT L. GIFFORD, OF BARKER, NEW YORK.

AUTOMATIC RELEASING DEVICE FOR PRESSURE-PUMPS.

1,128,596.  Specification of Letters Patent.  Patented Feb. 16, 1915.

Application filed March 30, 1911. Serial No. 617,971.

*To all whom it may concern:*

Be it known that we, ARTHUR G. GIFFORD and BERT L. GIFFORD, both citizens of the United States, and residents of Barker, in the county of Niagara and State of New York, have invented new and useful Improvements in Automatic Releasing Devices for Pressure-Pumps, of which the following is a specification.

Our invention relates to improvements in automatic releasing devices for pressure pumps whereby the pressure creating means is cut off when the pressure reaches a certain point.

Our invention while useful for a great many purposes, is primarily designed for use in power spraying machines.

In spraying machines it is very desirable that a continuous spray be ejected from the spraying nozzle under a constant pressure, and while attempts have been made to accomplish this, the releasing mechanism has heretofore been so controlled that the resistance offered by the pressure pump was relied upon to govern the time when the release was to be actuated to prevent increasing the pressure beyond a predetermined number of pounds per square inch. This results in the releasing machanism being cut out under different pressures. For example,—when the conditions are normal and all moving parts acting freely and the releasing device is set to be cut out at 100 pounds pressure, proper release will be made when such pressure is attained; but if the pressure pump is not properly oiled or for any other reason the pump piston does not work freely, or when friction increases at the connections or bearing points of any working parts by reason of improper lubrication, or when for any other reason the pump, parts of the motor actuating the pump, parts between the motor and the pump, or parts between the pump and the releasing mechanism fail to work freely, the resistance will be imparted to the releasing mechanism which will be cut out under a pressure much less than 100 pounds per square inch. Therefore, as now designed, releasing mechanisms are controlled by the resistance offered against the piston of the pump, which ofttimes indicates a false pressure for the reasons stated and causes the fluid to be sprayed from the nozzle under varying pressures, as these conditions are constantly changing, particularly when the apparatus is in the care of an inexperienced party who is not familiar with mechanical parts and the attention they need to have them operate properly.

Spraying machines are usually operated by farmers, gardeners, and others who are not able to give such machines proper care, and we have therefore designed this invention so that the varying resistance offered against the action of the pump piston brought on by improper care, will not affect the releasing device.

The primary object of our invention therefore is the provision of a releasing device which will be controlled directly by the pressure so that the disadvantages above referred to are entirely eliminated.

Another object of our invention is to provide an automatic release for pressure pumps so arranged that it will cut the pump out of action and permit the motor to continue in operation, and as soon as the pressure is reduced will automatically throw in the release to cause the pump to be actuated by the motor.

Other objects are to provide a simple, inexpensive and effective releasing device controlled directly by the pressure within an accumulator or pressure tank, and to otherwise improve on devices of this kind now in use.

With these objects in view, the invention consists in a releasing device automatically actuated by accumulated pressure, and it also consists in the arrangement and combination of devices, and in the construction, arrangement and combination of parts to be hereinafter described and particularly pointed out in the subjoined claims.

In the drawings, Figure 1 is a side elevation of a spraying machine embodying our invention in one of the many forms in which it may be applied. Fig. 2 is an enlarged vertical section taken on line 2—2, Fig. 1, looking in the direction of the arrow crossing said line. Fig. 3 is a detached perspective view of the main rock lever forming part of our improved releasing device. Fig. 4 is a detached perspective view of the auxiliary rock lever adapted to be thrown into and out of connection with the main rock lever. Fig. 5 is a detached perspective view of the lock lever carried by the main rock lever.

Referring now to the drawings in detail, like letters of reference refer to like parts in the several figures.

In spraying machines there is usually employed an engine or motor, a pressure pump, and a spraying nozzle, and in some machines an accumulator or pressure tank is used.

In the drawings we have designated the engine or motor by the letter A, the pressure pump B, the spraying device C, and the accumulator or pressure tank D.

Our improved releasing device is interposed between the engine and the pump and is actuated in whole or in part by the engine when running. On the engine shaft is arranged a pinion F with which meshes a gear wheel G having one end of a pitman $g$ pivotally secured thereto which is pivotally connected at its other end to the releasing device.

The pump has a piston rod H, to the outer end of which is connected one end of a pitman $h$ whose other end is pivotally connected to said releasing-device. The releasing device herein shown is one of the many forms in which it may be constructed, and comprises a base or casting I having spaced ears $i$ rising therefrom, preferably three in number, and having also a pressure cylinder J in which may be contained a quantity of oil between its inner end and a piston K therein, or the piston may be actuated directly by air pressure without the use of oil, as may be desired. At the outer end of the piston is a thrust rod $k$ for a purpose to presently appear.

L designates a main rock lever pivotally connected between two of the ears $i$ and having near its lower end a pair of ears $l$ and near its upper end a yoke M and an opening $m$ in line with said yoke.

N designates an auxiliary rock lever pivotally connected between two of the ears $i$ preferably with the same pivot pin which connects the main rock lever to the base. At the upper end of the auxiliary rock lever is a segment $n$ having a hole O centrally therein. To the upper end of the main rock lever L the pitman $g$ is connected and between the ears $l$ on said rock lever a lock lever P is pivotally secured, said lock lever extending above and beneath its pivotal point and being engaged at its lower end by the thrust rod $k$ of the piston K. Preferably said piston is arranged coincident with the pivot pin connecting the rock levers to the base so that the swinging of the said levers will not move the lock lever P out of operative position with said thrust rod.

The upper end of the lock lever P has a lock pin $p$ which is adapted to pass through the opening $m$ in the main rock lever and enter the opening O in the auxiliary rock lever, thus connecting said levers so that they rock together. Between the yoke and the upper end of the lock lever, a spiral spring R is interposed which acts to force said upper end toward the rock levers and thus thrust the pin $p$ thereof into the opening O when brought into registration with the opening $m$ in which said pin is always held. Said action also causes the lower end of the lock lever to swing away from the rock levers so as to force the piston K into its pressure cylinder; but at all times said lock-lever retains contact with the end of the thrust rod $k$ of said piston. The pitman $h$ is connected with one end of the segment $n$ at the upper end of the auxiliary rock lever. When the rock levers are connected in the manner described, the auxiliary rock lever N is caused to rock with the main rock lever L and movement imparted to the piston of the pump B.

S designates a supply pipe extending from the pump to the source of supply, which in a spraying machine is a solution tank; and in this pipe is a check valve $s$. A pipe T connects the pump with the accumulator or pressure tank D and to this pipe is connected a hose or other flexible tube U having a spraying nozzle or head $u$ from which the fluid is sprayed under almost constant pressure, due to the pressure in said tank being maintained, as near as may be, at a predetermined degree. In the pipe T between the spraying nozzle and the pump, a check valve $t$ is arranged and a valve $v$ controls the flow of the fluid through the hose U.

In the drawings we have shown a single hose, but provision is made for a second hose, as shown at V. The fluid to be sprayed is controlled by valves $v$ which are arranged in pipes connecting the hose with the pipe T. A pipe W connects the pressure cylinder J with the pressure tank and the latter is provided with a gage $w$ to indicate the pressure within the tank. Pressure is exerted against the piston K from the tank D, sufficient pressure being within the pressure tank at all times to hold the thrust rod $k$ of said piston in contact with the lower end of the lock lever P and the spring R is of the proper tension to hold the lock lever in locked position until the predetermined air pressure is accumulated within the pressure tank, after which the piston K is forced out by the accumulated pressure and causes the lock lever to swing on its pivot against the action of the spring R, thus withdrawing the lock pin $p$ of said lever from the auxiliary lock lever and disconnecting the pump from the engine.

In starting the machine, the parts will be as shown in Fig. 1 of the drawings; that is, the auxiliary rock lever will be positioned to bring the opening O therein in line with the opening $m$ in the main rock lever so that the lock pin $p$ will enter the opening O of the auxiliary rock lever; it will then be forced into said opening by the spring R and cause both levers to rock together, whereupon the piston within the pressure pump B will be reciprocated. By any suitable means, such as an air inlet pipe X having a hand valve $x$, air may be drawn into the pump and by the latter forced into the pressure tank until a certain pressure is indicated on the gage $w$. The hand valve $x$ is open during such operation and by means of a hand valve Y in the pipe S, the admission of the spraying fluid is shut off. When the desired pressure is reached in the pressure tank, the valve $x$ may be closed and the valve Y opened, after which the pump will draw in the spraying fluid and force the same into the pressure chamber. The pressure of the chamber will then serve, upon opening the valve controlling the spraying nozzle, to eject the fluid under the desired pressure, which pressure is maintained as near as can be by the actuation of the pump; but the capacity of the pump is such that it will increase the pressure rather than decrease it and particularly when directing the spraying nozzle from one point toward another, during which time the valve controlling the spray will be shut, and as the pump and engine continue to operate, the pressure will or may increase beyond that desired, and as it reaches a point beyond a predetermined pressure, it will act against the piston K of the pressure cylinder J either directly, or through the medium of an interposed body of oil, and cause said piston to be forced outward, thus swinging the lock lever P on its pivot and disengaging the two rock levers, which permits the engine to run idle without imparting motion to the pressure pump, as the main rock lever L only, with its lock lever, will be caused to oscillate. This condition is maintained until after spraying again commences, when the pressure will be diminished and the spring R acts to overcome the pressure against the piston K, causing the two rock levers to be connected and the pump to again operate.

Any other device may be substituted for the pressure cylinder J and its coöperating parts so long as it serves to release the pressure pump from the engine and is controlled directly by accumulated pressure. It is apparent therefore that carelessness on the part of the operator will not affect the point at which the pump will be disconnected or released from the engine, as conditions such as above referred to which cause resistance against operating parts, would not affect the releasing device, as the pressure must be stored or accumulated in the pressure chamber and reach the predetermined number of pounds per square inch before the pump can be disconnected from the engine. We therefore do not control our releasing device by the resistance against the piston of the pressure pump, as this might indicate a false pressure and the resistance in some cases be equal with an accumulated pressure of sixty pounds per square inch to the resistance against the pump piston in other cases, where the pressure is at ninety pounds or more per square inch. Therefore, by our invention we are assured of almost constant pressure, as near as can be, at the spraying nozzle whether the actuating parts are working freely or not, and as we believe ourselves to be the first embodying this principle in a releasing device, we do not wish to be limited to the construction or arrangement of parts herein shown, but hold ourselves at liberty to make such changes as fully fall within the scope of the following claims which are to be given the broadest interpretation permissible by the prior art.

Having thus described our invention, what we claim is,—

1. A releasing device comprising two rock members, one of said members having a yoke, a lock member pivotally connected to said last-mentioned rock member and extending into said yoke and having a lock pin engaging both rock members to lock them together, and a spring interposed between said yoke and said lock member tending to retain said pin in locked position.

2. The combination with a pressure tank, of a releasing device comprising two rock levers pivotally secured at one of their ends, a spring-actuated lock pin locking said levers together and adapted to pass through one of said levers and enter the other, a pressure piston to cause said lock pin to be actuated against the action of its spring and permit one of said levers to move independent of the other, and means to cause the pressure of the air within said tank to be exerted against said pressure piston.

3. The combination with a pressure tank, of a releasing device comprising two rock levers having their pivotal points coincident and each having an opening therethrough, one of said levers having a yoke, a lock lever pivotally connected at a point between its ends with the last-mentioned rock lever and extending into the yoke and having also a pin entered into the openings of said rock levers, a spring interposed between said yoke and said lock lever, a cylinder having connection with said pressure tank, and a piston within said cylinder whose axis is coincident with the axis of said lock-levers and the outer end of which is in contact with said lock lever, one of said lock levers being connected to a driving and the other to a driven part.

In testimony whereof, we have affixed our signatures in the presence of two subscribing witnesses.

ARTHUR G. GIFFORD.
BERT L. GIFFORD.

Witnesses:
Geo. A. Hauser,
Frank P. Conlin.

Copies of this patent may be obtained for five cents each, by addressing the "Commissioner of Patents, Washington, D. C."